United States Patent
Jung et al.

(10) Patent No.: US 10,946,724 B2
(45) Date of Patent: Mar. 16, 2021

(54) APPARATUS AND METHOD OF CONTROLLING COMPRESSOR OF AIR CONDITIONING DEVICE OF VEHICLE

(71) Applicants: Hyundai Motor Company, Seoul (KR); Kia Motors Corporation, Seoul (KR)

(72) Inventors: Tae Hun Jung, Seoul (KR); Jeong Sik Seo, Gyeonggi-do (KR); Jaeyeon Moon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 16/103,844

(22) Filed: Aug. 14, 2018

(65) Prior Publication Data

US 2019/0248213 A1 Aug. 15, 2019

(30) Foreign Application Priority Data

Feb. 12, 2018 (KR) .......................... 10-2018-0017216

(51) Int. Cl.
*B60H 1/32* (2006.01)
(52) U.S. Cl.
CPC ................................. *B60H 1/3208* (2013.01)
(58) Field of Classification Search
CPC ............................. B60H 1/3208; B60H 1/322
See application file for complete search history.

(56) References Cited

U.S. PATENT DOCUMENTS

| 2004/0036261 A1* | 2/2004 | Breed | B60N 2/2863 280/735 |
| 2004/0230376 A1* | 11/2004 | Ichikawa | G01C 21/26 702/2 |
| 2007/0080037 A1* | 4/2007 | Larry | F02B 67/06 192/21.5 |
| 2013/0074526 A1* | 3/2013 | Rollinger | F25B 49/022 62/61 |

(Continued)

FOREIGN PATENT DOCUMENTS

| KR | 101755518 B1 | 7/2017 |
| KR | 20170069808 A | 9/2017 |

*Primary Examiner* — Behrang Badii
*Assistant Examiner* — Daniel L Greene
(74) *Attorney, Agent, or Firm* — Mintz Levin Cohn Ferris Glovsky and Popeo, P.C.; Peter F. Corless

(57) ABSTRACT

An apparatus for controlling a compressor includes: an operation information detector which detects operation information from various sensors according to an operation of a vehicle; a compressor which compresses a refrigerant for operating an air conditioner; and a controller which performs starting acceleration control of momentarily decreasing an operation rate of the compressor, which uses engine power in an acceleration situation of the vehicle, in which the controller stores a first map, in which a starting acceleration entry condition according to a driving pattern and a heat load of the vehicle is defined in a plurality of levels, sets a starting acceleration entry condition having a final level corresponding to the driving pattern according to a starting acceleration entry frequency of a driver for a predetermined unit time within a limited level range of the first map, and adjusts a starting acceleration control frequency of the compressor.

15 Claims, 10 Drawing Sheets

(56) References Cited

U.S. PATENT DOCUMENTS

| | | | |
|---|---|---|---|
| 2013/0074529 A1* | 3/2013 | Rollinger | B60H 1/3208 |
| | | | 62/115 |
| 2013/0074537 A1* | 3/2013 | Rollinger | B60H 1/00807 |
| | | | 62/228.1 |
| 2013/0131919 A1* | 5/2013 | Pan | B60H 1/3208 |
| | | | 701/36 |
| 2013/0166181 A1* | 6/2013 | Pan | F02D 41/1406 |
| | | | 701/110 |
| 2013/0211650 A1* | 8/2013 | Tashiro | B60W 20/00 |
| | | | 701/22 |
| 2018/0148037 A1* | 5/2018 | Pursifull | B60W 20/15 |
| 2018/0148038 A1* | 5/2018 | Ulrey | B60W 20/15 |

* cited by examiner

FIG. 3

※ MAP_1 (Level determination map)

| Division | V1 | A | B | C | S1 | S2 | S3 | S4 | S5 | S6 | S7 | S8 |
|---|---|---|---|---|---|---|---|---|---|---|---|---|
| Level 0 | 20.0 | 1.0 | 1.0 | 1.0 | 1.00 | 1.00 | 1.00 | 1.00 | 1.00 | 1.00 | 1.00 | 1.00 |
| Level 1 | 20.0 | 1.0 | 1.0 | 1.0 | 0.88 | 0.89 | 0.90 | 0.96 | 0.96 | 0.98 | 0.98 | 1.00 |
| Level 2 | 20.0 | 1.0 | 1.0 | 1.0 | 0.76 | 0.78 | 0.80 | 0.84 | 0.91 | 0.95 | 0.96 | 1.00 |
| Level 3 | 20.0 | 1.0 | 1.0 | 1.0 | 0.64 | 0.67 | 0.70 | 0.77 | 0.85 | 0.90 | 0.94 | 1.00 |
| Level 4 | 20.0 | 1.0 | 1.0 | 1.0 | 0.52 | 0.56 | 0.60 | 0.69 | 0.78 | 0.85 | 0.92 | 1.00 |
| Level 5 | 20.0 | 1.0 | 1.0 | 1.0 | 0.40 | 0.45 | 0.50 | 0.60 | 0.70 | 0.80 | 0.90 | 1.00 |
| Level 6 | 22.5 | 1.0 | 1.0 | 1.0 | 0.40 | 0.45 | 0.50 | 0.60 | 0.70 | 0.80 | 0.90 | 1.00 |
| Level 7 | 25.0 | 1.0 | 1.0 | 1.0 | 0.40 | 0.45 | 0.50 | 0.60 | 0.70 | 0.80 | 0.90 | 1.00 |
| Level 8 | 27.5 | 0.5 | 0.5 | 0.5 | 0.40 | 0.45 | 0.50 | 0.60 | 0.70 | 0.80 | 0.90 | 1.00 |
| Level 9 | 30.0 | 0.35 | 0.5 | 0.5 | 0.40 | 0.45 | 0.50 | 0.60 | 0.70 | 0.80 | 0.90 | 1.00 |

FIG. 4

※ MAP_2 (Starting acceleration entry condition control map)

| Division | 800 rpm | 1000 rpm | 1500 rpm | 2000 rpm | 3000 rpm | 4000 rpm | 5000 rpm | 6000 rpm |
|---|---|---|---|---|---|---|---|---|
| Entry (APS opening, % or more) | 35↑ *S1 | 35↑ *S2 | 45↑ *S3 | 55↑ *S4 | 65↑ *S5 | 75↑ *S6 | 85↑ *S7 | 85↑ *S8 |
| Release (APS opening, % or less) | 32↓ *S1 | 32↓ *S2 | 42↓ *S3 | 52↓ *S4 | 63↓ *S5 | 72↓ *S6 | 82↓ *S7 | 82↓ *S8 |

FIG. 5

※ MAP_3 (Level change amount determination map according to driving pattern)

| Entry frequency (number of times) | Level change | Entry time (second) | Level change |
|---|---|---|---|
| 0 | +3 | 0 | +3 |
| 1 | +2 | > 0, ≤ 2.0 | +2 |
| 2 | +1 | > 2.0, ≤ 4.0 | +1 |
| 3 | 0 | > 4.0, ≤ 6.0 | 0 |
| 4 | -1 | > 6.0, ≤ 8.0 | -1 |
| 5 | -2 | > 8.0, ≤ 10.0 | -2 |
| 6 | -3 | > 10.0, ≤ 12.0 | -3 |
| 7 | -3 | > 12.0, ≤ 14.0 | -3 |
| 8 | -3 | > 14.0, ≤ 16.0 | -3 |
| 9 or more | -3 | > 16.0 | -3 |

FIG. 6

※ MAP_4 (Level limit according to heat load)

| Outdoor temperature (℃) | ≤ 15 | > 15, ≤ 20 | > 20, ≤ 25 | > 25, ≤ 30 | > 30, ≤ 32.5 | > 32.5, ≤ 35 | > 35, ≤ 37.5 | > 37.5, ≤ 40 | > 40 |
|---|---|---|---|---|---|---|---|---|---|
| Level limit_Outdoor temperature | ≤ 9 | ≤ 9 | ≤ 9 | ≤ 9 | ≤ 9 | ≤ 9 | ≤ 9 | ≤ 2 | ≤ 0 |
| EVAP temperature (℃) | ≤ 2.5 | > 2.5, ≤ 5 | > 5, ≤ 7.5 | > 7.5, ≤ 10 | > 10, ≤ 12.5 | > 12.5, ≤ 15 | > 15, ≤ 17.5 | > 17.5, ≤ 20 | > 20 |
| Level Limit_EVAP temperature | ≤ 9 | ≤ 9 | ≤ 9 | ≤ 9 | ≤ 9 | ≤ 5 | ≤ 2 | ≤ 2 | ≤ 0 |
| Duty (%) | Less than 60 | ≥ 60, < 70 | ≥ 70, < 75 | ≥ 75, < 80 | ≥ 80, < 85 | ≥ 85, < 90 | ≥ 90, < 95 | ≥ 95, < 100 | ≥ 100 or more |
| Level limit_COMP | ≤ 9 | ≤ 8 | ≤ 8 | ≤ 8 | ≤ 8 | ≤ 8 | ≤ 8 | ≤ 7 | ≤ 0 |
| Voltage (V) | ≤ 1.5 | > 1.5, ≤ 3 | > 3, ≤ 4.5 | > 4.5, ≤ 6 | > 6, ≤ 8.5 | > 8.5, ≤ 10 | > 10, ≤ 11.5 | > 11.5, ≤ 13 | > 13 |
| Level limit_Blower | ≤ 9 | ≤ 9 | ≤ 9 | ≤ 9 | ≤ 9 | ≤ 9 | ≤ 9 | ≤ 9 | ≤ 9 |
| INCA temperature (℃) | ≤ 18 | > 18, ≤ 20 | > 20, ≤ 22 | > 22, ≤ 24 | > 24, ≤ 26 | > 26, ≤ 28 | > 28, ≤ 30 | > 30, ≤ 32 | > 32 |
| Level limit_INCA | ≤ 9 | ≤ 9 | ≤ 9 | ≤ 9 | ≤ 9 | ≤ 5 | ≤ 4 | ≤ 2 | ≤ 0 |
| Voltage (V) | ≤ 0.5 | > 0.5, ≤ 1.0 | > 1.0, ≤ 1.5 | > 1.5, ≤ 2.0 | > 2.0, ≤ 2.5 | > 2.5, ≤ 3.0 | > 3.0, ≤ 3.5 | > 3.5, ≤ 4.0 | > 4.0 |
| Level limit_Photo | ≤ 9 | ≤ 9 | ≤ 9 | ≤ 9 | ≤ 9 | ≤ 9 | ≤ 9 | ≤ 9 | ≤ 9 |
| Voltage (℃) | ≤ 14 (including LO) | > 14, ≤ 16 | > 16, ≤ 18 | > 18, ≤ 20 | > 20, ≤ 22 | > 22, ≤ 24 | > 24, ≤ 26 | > 26, ≤ 28 | > 28 (including HI) |
| Level limit_Tset | ≤ 5 | ≤ 5 | ≤ 5 | ≤ 5 | ≤ 9 | ≤ 9 | ≤ 9 | ≤ 9 | ≤ 9 |
| Voltage (℃) | ≤ 0.5 | > 0.5, ≤ 1.0 | > 1.0, ≤ 1.5 | > 1.5, ≤ 2.0 | > 2.0, ≤ 2.5 | > 2.5, ≤ 3.0 | > 3.0, ≤ 3.5 | > 3.5, ≤ 4.0 | > 4.0 |
| Level limit_INTAKE | ≤ 5 | ≤ 5 | ≤ 5 | ≤ 5 | ≤ 5 | ≤ 5 | ≤ 5 | ≤ 9 | ≤ 9 |

FIG. 7

※ MAP_5 (Starting acceleration duty determination map)

| Division | 800 rpm | 1000 rpm | 1500 rpm | 2000 rpm | 3000 rpm | 4000 rpm | 5000 rpm | 6000 rpm |
|---|---|---|---|---|---|---|---|---|
| APS=0% | 100 | 100 | 100 | 100 | 100 | 100 | 100 | 100 |
| APS=34%*S1 | 100 | 100 | 100 | 100 | 100 | 100 | 100 | 100 |
| APS=35%*S2 | 100*A | 100*A | 100*A | 100*B | 100*B | 100*B | 100*B | 100*B |
| APS=45%*S3 | 50*B | 50*B | 50*B | 100*B | 100*B | 100*B | 100*B | 100*B |
| APS=55%*S4 | 50*B | 50*B | 50*B | 100*B | 100*B | 100*B | 100*B | 100*B |
| APS=65%*S5 | 45*B | 45*B | 45*B | 50*B | 100*B | 100*B | 100*B | 100*B |
| APS=75%*S6 | 35*C | 35*C | 35*C | 50*C | 50*C | 100*C | 100*C | 100*C |
| APS=85%*S7 | 35*C | 35*C | 35*C | 35*C | 35*C | 35*C | 100*C | 100*C |
| APS≥86%*S8 | 0 | 0 | 0 | 0 | 35*C | 35*C | 35*C | 35*C |

APPARATUS AND METHOD OF CONTROLLING COMPRESSOR OF AIR CONDITIONING DEVICE OF VEHICLE

CROSS-REFERENCE TO RELATED APPLICATION(S)

This application claims under 35 U.S.C. § 119(a) the benefit of Korean Patent Application No. 10-2018-0017216 filed in the Korean Intellectual Property Office on Feb. 12, 2018, the entire contents of which are incorporated herein by reference.

BACKGROUND

(a) Technical Field

The present disclosure relates to an apparatus and method of controlling a compressor, more particularly, to the apparatus and method applied to an air conditioning device of a vehicle.

(b) Description of the Related Art

In general, power performance and fuel efficiency of a vehicle are characteristics of a vehicle to be continuously improved, and may influence regulations of each country and marketability. Accordingly, manufacturing companies continuously conduct research on improvement of power performance and fuel efficiency, and as a part of the research, there is a demand for improvement of an air conditioning device, which corresponds to an auxiliary device.

An air conditioning device includes a compressor, an evaporator, and a condenser, and the compressor serves to suck a refrigerant from the evaporator, compress the refrigerant, and then discharge the compressed refrigerant to the condenser. The compressor may receive power of an engine, and an operation thereof may be limited according to a control state (power requirement) of the engine. For example, under a predetermined opening condition of an accelerator pedal sensor (APS), the compressor is controlled to secure a power requirement by performing an air conditioner operation stop (A/C CUT) control.

However, the air conditioning device in the related art performs the A/C CUT control under the same opening condition of the APS regardless of a flatland/climbing condition of a vehicle, so that there is a disadvantage in that cooling performance is degraded due to the frequent generation of the A/C CUT.

Further, when the opening condition of the APS, in which the A/C CUT is generated, is set upwardly in order to solve the disadvantage of the cooling performance, there is a problem in that power performance of the engine is degraded due to A/C ON under a climbing condition requiring lots of engine torque.

Accordingly, in order to address tradeoffs between cooling performance and power performance, there is developed a technology of stopping a compressor or utilizing duty control within a range in which there is no problem in cooling performance.

In the meantime, recently, an operation of the compressor is excessively limited according to a driving pattern of a driver, so that there may be dissatisfaction of cooling performance due to frequent A/C CUT.

However, in the related art, since the air conditioning device is controlled according to a single logic that is set regardless of a driving pattern of a driver and an inside heat load, there is a disadvantage in that the A/C CUT phenomenon is frequently generated by a rapid acceleration driving pattern of the driver.

Further, in a slow acceleration driving pattern, in which a driver relatively presses less on an accelerator pedal, a vehicle is operated at a level which always fails to reach an accelerator opening condition, under which a duty starts to be decreased in a duty control logic, so that there is a problem in that fuel efficiency is not improved.

The above information disclosed in this Background section is only for enhancement of understanding of the background of the disclosure and therefore it may contain information that does not form the prior art that is already known in this country to a person of ordinary skill in the art.

SUMMARY

The present disclosure provides an apparatus and method of controlling a compressor, which maximize cooling performance when an inside heat load is high, and actively and variably controls a compressor according to a driving pattern of a driver when a heat load is low, thereby addressing tradeoffs among fuel efficiency performance, power performance, and cooling performance. An exemplary embodiment of the present disclosure provides an apparatus for controlling a compressor of an air conditioning device of a vehicle, the apparatus including: an operation information detector which detects operation information from various sensors according to an operation of the vehicle; the compressor which compresses a refrigerant for operating an air conditioner of an air conditioning device; and a controller which performs starting acceleration control of momentarily decreasing an operation rate of the compressor, which uses engine power in an acceleration situation of the vehicle, in which the controller stores a first map, in which a starting acceleration entry condition according to a driving pattern and a heat load of the vehicle is defined in a plurality of levels, sets a starting acceleration entry condition having a final level corresponding to the driving pattern according to a starting acceleration entry frequency of a driver for a predetermined unit time within a limited level range of the first map, which is determined based on the heat load of the vehicle, and adjusts a starting acceleration control frequency of the compressor.

The first map may include starting acceleration entry condition control constants, which are set in a plurality of levels and are divided for a vehicle speed condition and an opening condition of an accelerator pedal sensor (APS) for each engine revolutions per minute (rpm) section.

When the starting acceleration entry frequency of the driver is determined as a slow acceleration driving pattern in which a starting acceleration entry frequency is lower than a starting acceleration entry frequency of a general driving pattern, the controller may change a level in a direction, in which the starting acceleration entry frequency is increased, in the first map, and when the starting acceleration entry frequency of the driver is determined as a rapid acceleration driving pattern in which a starting acceleration entry frequency is higher than the starting acceleration entry frequency of the general driving pattern, the controller may change a level in a direction, in which the starting acceleration entry frequency is decreased, in the first map.

The controller may update the final level selected in the first map according to the driving pattern and the heat load of the vehicle in a second map which sets the starting acceleration entry condition, and recognize whether the driver enters starting acceleration according to the vehicle speed, the engine rpm, and the opening of the APS detected by the operation information detector.

The controller may sum up the starting acceleration entry frequency and an entry time based on the opening of the APS and the engine rpm on a period of the unit time when the air conditioner is operated and recognize the driving pattern.

The controller may calculate each of a first level change amount according to the starting acceleration entry frequency and a second level change amount according to the starting acceleration entry time for the unit time based on a starting acceleration entry condition of a set level by utilizing a third map which determines a change amount between the levels in the first map.

The controller may determine a smaller value between the first level change amount according to the entry frequency and the second level change amount according to the entry time as a final change amount and determine a change level based on a driving pattern.

The controller may compare a starting acceleration entry condition change level determined based on the driving pattern and a level limit determined based on the heat load of the vehicle, and set a smaller level between two levels as a starting acceleration entry condition.

The controller may determine the rea-time detected heat load of the vehicle through a fourth map, in which a level limit is set for each heat load of the vehicle, and determine the smallest value among the level limits as a final level limit.

The fourth map may store a level limit for each of setting conditions of heat load items including an outdoor temperature, a thermistor temperature, a compressor duty, a blower voltage, an INCA temperature, a solar radiation temperature, an automatic air conditioner (FATC) setting temperature, and an intake setting temperature.

The controller may control an operation rate of the compressor by an operation rate limit corresponding to the opening of the APS and the engine rpm of the vehicle by utilizing a fifth map, in which a compressor operation rate limit (duty limit) is set based on each opening condition of the APS and each engine rpm condition based on the final level.

When an average of the vehicle speeds for the unit time is equal to or lower than a set reference vehicle speed, the controller may maintain a starting acceleration maintenance condition having an existing set level without a change in a level.

Another exemplary embodiment of the present disclosure provides a method of controlling a compressor of a compressor control apparatus, which performs starting acceleration control of momentarily decreasing an operation rate of the compressor of an air conditioning device using engine power during acceleration of a vehicle, the method including steps of: a) when an air conditioner of the vehicle is operated, detecting operation information for controlling the compressor according to an operation of the vehicle; b) selecting an initial level designated in a first map, in which a starting acceleration entry condition is defined in a plurality of levels according to a driving pattern and a heat load of the vehicle and setting a starting acceleration entry condition; c) summing up a starting acceleration entry frequency and an entry time for a predetermined unit time according to the driving pattern of a driver and determining a change level in the first map; d) determining a final level limit selectable in the first map based on the real-time detected heat load of the vehicle; and e) comparing the change level and the final level limit and determining a smaller value as a final level, and changing the starting acceleration entry condition on a period of a next unit time.

The step b) may include updating the starting acceleration entry condition control constant of the initial level in a second map, and setting a starting acceleration entry condition according to a vehicle speed, an engine rpm, and the opening of an accelerator pedal sensor (APS) based on the initial level.

The step c) may include calculating a first level change amount according to the starting acceleration entry frequency for the unit time based on the starting acceleration entry condition of the set level by utilizing a third map, which determines a change amount between the levels in the first map; and calculating a second level change amount according to a starting acceleration entry time for the unit time.

The step c) may include determining a smaller value between the first level change amount and the second level change amount as a final change amount and selecting a change level based on the driving pattern.

The step c) may include: extracting a level limit for each real-time detected heat load factor of the vehicle through a fourth map, in which a level limit for heat load of the vehicle is set; and determining the smallest value among the level limits of the extracted heat load factors of the vehicle as the final level limit.

The heat load of the vehicle may include at least one of an outdoor temperature, a thermistor temperature, a compressor duty, a blower voltage, an INCA temperature, a solar radiation temperature, an automatic air conditioner (FATC) setting temperature, and an intake setting temperature.

The step c) may include: c-1) detecting a vehicle speed of the vehicle, an engine rpm, and the opening of the APS and determining that the driver enters starting acceleration when the starting acceleration entry condition is satisfied; c-2) controlling an operation rate of the compressor by a duty limit corresponding to the opening of the APS and the engine rpm of the vehicle to which the initial level is applied by utilizing a fifth map, in which a compressor duty limit is set based on the opening of the APS and an engine rpm condition; and c-3) summing up the number of times of starting acceleration entry and an entry time when the starting acceleration entry is released.

The step c-2) may include selecting a smaller value between the duty limit and a basic duty (Duty_fatc) for controlling an operation rate of a variable capacity-type compressor and controlling an operation rate of the compressor.

According to the exemplary embodiment of the present disclosure, it is possible to implement the compressor control logic, by which a compressor is actively variably controlled according to a driving pattern of a driver and a heat load of a vehicle, thereby reasonably solving tradeoffs among cooling performance, fuel efficiency performance, and engine power performance without an increase in cost and weight according to an addition of hardware.

Further, it is possible to concentrate to make an indoor side be pleasant by maximizing cooling performance under a condition in which a heat load of the vehicle is high, and control an engine torque applied to the compressor with an optimum frequency according to a driving pattern of a driver when the heat load inside the vehicle is decreased, thereby achieving effects in securing cooling performance and maximizing fuel efficiency improvement.

BRIEF DESCRIPTION OF THE DRAWINGS

FIG. 3 is a first map (MAP_1) for selecting a starting acceleration entry condition according to the exemplary embodiment of the present disclosure.

FIG. 4 is a second map (MAP_2), in which a starting acceleration entry condition is set by adopting a level selected in the first map according to the exemplary embodiment of the present disclosure.

FIG. 5 is a third map (MAP_3) for determining a level change amount according to monitoring of a driving pattern according to the exemplary embodiment of the present disclosure.

FIG. 6 is a fourth map (MAP_4), in which a level limit is set according to a heat load of a vehicle according to the exemplary embodiment of the present disclosure.

FIG. 7 is a fifth map (MAP_5), in which a starting acceleration duty is determined according to the exemplary embodiment of the present disclosure.

DETAILED DESCRIPTION OF THE EMBODIMENTS

Figure 1:
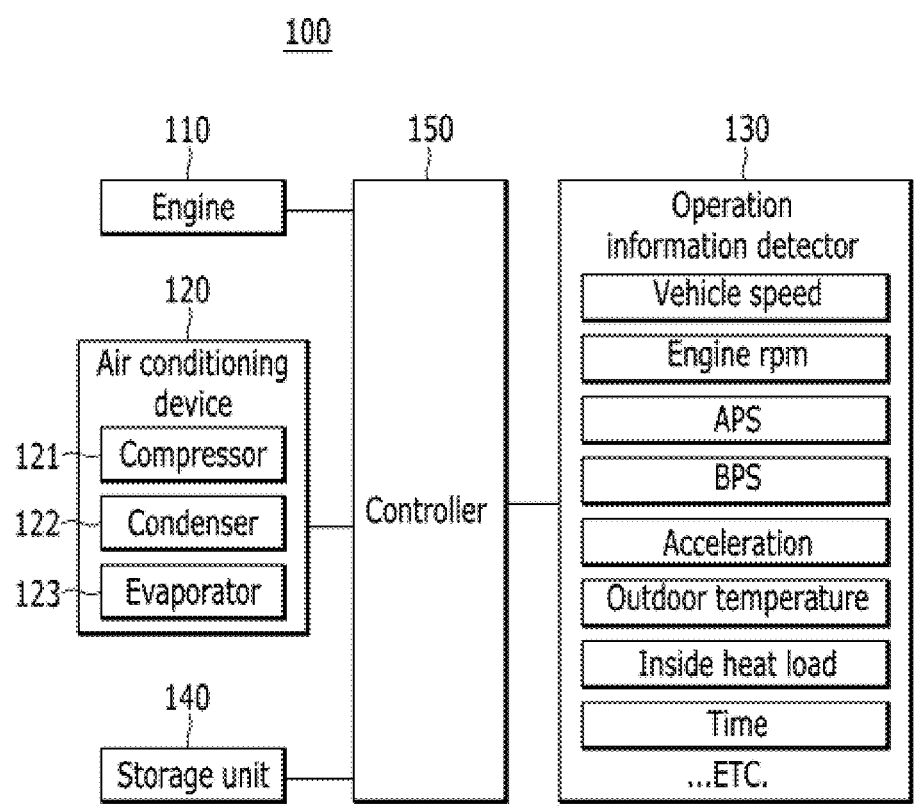
FIG. 1 is a block diagram schematically illustrating a compressor control apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Further, in the exemplary embodiment below, in order to efficiently describe the essential technical characteristics of the present disclosure, terms may be appropriately modified, combined, or separated and used for making those skilled in the art clearly understand the present disclosure, but the present disclosure is not limited by the terms.

Hereinafter, an apparatus and a method of controlling a compressor according to an exemplary embodiment of the present disclosure will be described in detail with reference to the drawings.

FIG. 1 is a block diagram schematically illustrating a compressor control apparatus according to an exemplary embodiment of the present disclosure.

Referring to FIG. 1, a compressor control apparatus 100 according to an exemplary embodiment of the present disclosure includes an engine 110, an air conditioning device 120, an operation information detector 130, and a controller 150.

The engine 110 combusts fuel and generates power. That is, the engine 110 can be any of various existing engines, such as a gasoline engine or a diesel engine, that run on fossil fuels.

The engine 110 may provide power for operating a compressor 121 of the air conditioning device 120.

The air conditioning device 120 may be used for heating, ventilating, and cooling an internal side of a vehicle. To this end, the air conditioning device 120 includes the compressor 121, a condenser 122, and an evaporator 123. When an operation rate (duty) of the compressor 121 is increased, cooling performance of the air conditioning device 120 may be improved.

The compressor 121 sucks a refrigerant from the evaporator 123 and compresses the sucked refrigerant when an air conditioner (A/C) for cooling is operated. The compressor 121 may be formed of a variable capacity-type compressor 121 for a vehicle.

The compressor 121 may include a pressure adjusting valve, and may adjust pressure of a refrigerant by a pressure adjusting valve.

The condenser 122 condenses the refrigerant compressed by the compressor 121 and liquefies the condensed refrigerant.

The evaporator 123 vaporizes the refrigerant liquefied by the condenser 122.

The air conditioning device 120 is well known to a person of ordinary skill in the art, so that a detailed description thereof will be omitted.

The operation information detector 130 detects operation information measured by various sensors according to an operation of the vehicle. Herein, the operation information may be data measured by a sensor, or information processed in the form required for control according to the exemplary embodiment of the present disclosure.

For example, the operation information detector 130 may detect a vehicle speed, an engine revolutions per minute (rpm), an accelerator pedal sensor (APS), BPS, acceleration (gradient), an outdoor temperature, an inside heat load, a time, and the like from various sensors.

A storage unit 140 stores a program and data for operating the vehicle, and stores data generated according to the operation.

The storage unit 140 stores and manages a plurality of maps (MAP_1 to MAP_5) for variable control of the compressor 121. The maps will be described in detail below.

The controller 150 controls a general operation for the variable control of the compressor 121 according to a driving pattern and an inside heat load of the vehicle according to the exemplary embodiment of the present disclosure.

When a driver steps on an accelerator pedal for starting from a stop state of the vehicle or overtaking acceleration at a predetermined speed, a lot of fuel may be consumed due to acceleration, and in this case, the controller 150 performs starting acceleration control which momentarily decreases an operation rate (duty) of the compressor 121 that uses a part of power of the engine. The starting acceleration control which controls an operation rate (duty) of the compressor 121 has the same meaning as that of A/C duty control during an operation of the air conditioner, and may be used with the A/C duty control.

The controller 150 controls how much entry frequency of starting acceleration is increased and how much a duty is to be decreased when the driver enters the starting acceleration under a starting acceleration control condition variably set according to an operation pattern of a driver and a heat load of the vehicle.

To this end, the controller 150 stores a first map, in which a starting acceleration control condition according to a driving pattern and a heat load of the vehicle is defined in a plurality of levels, sets a starting acceleration entry condition having a level corresponding to a driving pattern according to a starting acceleration entry frequency of a driver for a predetermined unit time within a limited level range of the first map, which is determined based on the heat load of the vehicle, and adjusts a starting acceleration control frequency of the compressor.

The controller 150 monitors an acceleration pedal operation amount (APS opening) and a starting acceleration control frequency based on an engine rpm on a period of a predetermined unit time during an operation of the air conditioner (A/C ON), and recognizes a driving pattern of a driver. The unit time is a time of one period defined for recognizing a short-term driving pattern of the driver, and hereinafter, the present disclosure will be described based on an assumption that the unit time is 30 seconds, but the exemplary embodiment of the present disclosure is not limited thereto, and the unit time may be changed as necessary.

Figure 2:
FIG. 2 is a conceptual diagram illustrating optimized starting acceleration control according to a driving pattern of a driver according to the exemplary embodiment of the present disclosure.

FIG. 2 is a conceptual diagram illustrating optimized starting acceleration control according to a driving pattern of a driver according to the exemplary embodiment of the present disclosure.

Referring to FIG. 2, the controller 150 according to the exemplary embodiment of the present disclosure divides a driving pattern into a mild acceleration pattern (mild), a normal pattern, and a rapid acceleration pattern (dynamic/sports) according to a starting acceleration control frequency of a driver for a predetermined unit time. Herein, the driving patterns may be generally named similarly to a mild pattern, a normal pattern, and a dynamic/sports pattern, based on how a driving tendency of a driver is divided, and each driving pattern may be further subdivided into a plurality of levels according to a control frequency thereof (see the first map of FIG. 4).

The controller 150 may control an A/C duty by a general A/C duty control logic before cool-down, and may variably control an A/C duty by an optimum frequency, by which air conditioning fuel efficiency is improved according to a driving pattern of a customer, after cool-down.

For example, when it is determined that the starting acceleration control frequency according to the monitoring is the slow acceleration driving pattern, in which the starting acceleration control frequency is lower than the general driving pattern, the controller 150 variably controls an A/C duty so as to increase the starting acceleration control frequency and improves fuel efficiency.

Further, when it is determined that the starting acceleration control frequency according to the monitoring is the rapid acceleration driving pattern, in which the starting acceleration control frequency is higher than the general driving pattern, the controller 150 variably controls an A/C duty so as to decrease the starting acceleration control frequency and secures cooling performance.

Further, the controller 150 may check a heat load of the vehicle, which is updated by the operation information detector 130 in real time, and determine an A/C duty variable control condition limit based on the heat load of the vehicle.

Further, the controller 150 may compare the A/C duty variable control condition determined based on the driving pattern with the A/C duty variable control condition limit determined based on the heat load of the vehicle, and set the lower control condition as a final A/C duty variable control condition and actively variably control the compressor 121.

The controller 150 according to the exemplary embodiment of the present disclosure aims to more reasonably address tradeoffs among fuel efficiency, power performance, and cooling performance of the vehicle, which are presented as the problem in the art, through the variable control of the compressor 121.

To this end, the present disclosure has a characteristic in that under the condition in which the heat load of the vehicle is high, the controller 150 concentrates to make an indoor side have a pleasant temperature by maximizing cooling performance, and when the heat load of the vehicle is low, the controller 150 controls the engine torque applied to the compressor 121 by an optimum frequency according to the driving pattern of the driver, thereby maximizing a fuel efficiency improvement effect.

In the meantime, the controller 150 stores unique five maps for actively variably controlling the compressor 121 according to the object and the characteristic. Further, the controller 150 may variably set a starting acceleration control condition in consideration of the driving pattern of the driver and the heat load by using the five maps, and variably control an A/C duty according to the variably set starting acceleration control condition.

Hereinafter, the control maps utilized for the variable control of the compressor of the present disclosure will be described with reference to FIGS. 3 to 7.

First, FIG. 3 represents a first map (MAP_1) for selecting a starting acceleration entry condition according to the exemplary embodiment of the present disclosure.

Referring to FIG. 3, the first map includes starting acceleration entry condition control constants V1 to S8 with a plurality of levels (phases) so as to select a starting acceleration entry condition according to the driving pattern of a driver and a heat load of a vehicle.

Herein, it is described that the first map includes a total of 10 levels from level 0 to level 9, but the exemplary embodiment of the present disclosure is not limited thereto, and the number of levels divided in the first map and numerical values of the constants may be changed according to a specification and a test of a vehicle, to which the present disclosure is applied.

Further, investigating a starting acceleration entry condition item of each level, V1 means a vehicle speed condition for determining starting acceleration entry, and may be set up to 20 to 30 kph according to a level. A to C are constants multiplied to the amount of opening of the APS according to an engine rpm of the finally selected level, and S1 to S8 are constants (correction coefficients) multiplied to an opening of the APS for each engine rpm in order to determine a starting acceleration entry in the state where a vehicle speed of the vehicle satisfies V1, and each constant may be set to a value equal to or smaller than 1. That is, each level includes a correction constant which is capable of variably changing a vehicle speed condition V1 and an opening condition (% or more) of the APS for each section of the engine rpm for determining the starting acceleration entry.

The utilization of the first map will be described with reference to FIG. 4 below.

FIG. 4 is a second map (MAP_2), in which a starting acceleration entry condition is set by adopting the level selected in the first map according to the exemplary embodiment of the present disclosure.

Referring to FIG. 4, the second map is a calculation table for variably controlling an actual starting acceleration entry condition of the vehicle by adopting one final level selected among the plurality of levels included in the first map.

In the second map, when the air conditioner is operated, the constant of the final level selected in the first map is updated, and it is possible to recognize whether the driver enters the starting acceleration according to the vehicle speed, the engine rpm, and the amount of opening of the APS according to the driving pattern of the driver based on the updated constant.

For example, the controller 150 updates a starting acceleration entry condition control constant of level 5 set as a default at an initial time during an operation of the air conditioner in the second map, and monitors whether the driver enters the starting acceleration according to the vehicle speed, the engine rpm, and the opening of the APS for a unit time (for example, 30 seconds) based on the starting acceleration entry condition set by the update. Level 5 may be considered to correspond to a general driving pattern. Further, a process of updating a final level determined according to the result of the monitoring in the second map and variably setting the starting acceleration entry condition is repeated in a next unit time period.

For example, the controller 150 updates level 5 set as the default in the second map for initial 30 seconds (unit time) when the air conditioner is operated (A/C ON). In this case, when the vehicle speed detected by the operation information detector 130 is equal to or lower than 20 kph (0 kph≤vehicle speed≤V1) and the engine rpm and the opening of the APS are equal to or larger than values obtained by multiplying the opening of the APS for each engine rpm section (800 rpm to 6,000 rpm) by each of the constants of S1 to S8 by applying level 5 to the second map, the controller 150 may control that the driver enters the starting acceleration. Herein, the fact that the driver enters the starting acceleration means that the amount of operation of the compressor 121 is controlled to be decreased through the decrease in the A/C duty.

In the meantime, a compressor control logic using a single control map in the related art before level 5 is applied to the second map will be simply compared with the varied compressor control logic after level 5 is applied to the second map of the present disclosure and a difference will be described below.

First, under the basic starting acceleration entry condition before level 5 is applied to the second map, in the case where a vehicle speed is equal to or lower than 20 kph and an engine rpm is 800 rpm, when the opening of the APS is equal to or larger than 35%, the controller 150 determines that the driver enters the starting acceleration and decreases the amount of operation of the compressor 121 through the decrease in the duty.

However, substantially, when the vehicle speed is equal to or lower than 20 kph and an engine rpm is 800 rpm, a condition, in which the opening of the APS satisfies 35%, is rarely generated. The reason is that the condition is a defensive setting for securing cooling performance and there actually may be a person who further steps on or less steps on the accelerator pedal than the opening of the APS of 35%, but the opening of the APS of most of the customers does not exceed 35%, and when a driver has a driving tendency of the slow acceleration pattern, a probability that the driver enters the starting acceleration is further decreased. Accordingly, as illustrated in FIG. 2, the driver having the slow acceleration pattern may secure cooling performance, but has a disadvantage in that a fuel efficiency effect is insufficient because the A/C duty control frequency is decreased, and further, under the condition in which the heat load of the vehicle is low, cooling performance is minimally required and thus is not necessary.

In the meantime, when level 5 is applied to the second map, the same vehicle speed is equal to or lower than 20 kph and the engine rpm is 800 rpm, the basic opening of the APS of 35% is multiplied by the correction constant of 0.4 (S1), so that the opening of the APS is decreased to 14%. In this case, the opening of the APS is decreased to 14%, so that a starting acceleration entry time goes forward by the amount of decrease, so that a probability that the starting acceleration entry frequency and an entry maintenance time are increased is also increased. Accordingly, it is possible to improve fuel efficiency through the improvement of the A/C duty control frequency of the driver having the slow acceleration pattern as illustrated in FIG. 2.

Further, similar to the case of the driver having the rapid acceleration pattern, when the A/C duty control frequency is high, cooling performance is degraded, and in addition to this, under the condition in which the heat load of the vehicle is high, the A/C stop is frequently generated, thereby causing dissatisfaction. Accordingly, it is necessary to apply the level, in which it is possible to decrease the A/C duty control frequency in accordance with the driving pattern and secure cooling performance.

As described above, the level is generally divided into two sessions which determine a time, from which the A/C duty is decreased, and the amount, by which the A/C duty is decreased.

The level may be divided into levels 0 to 9 as represented in the first map and may be selectively applied to the second map in accordance with a driving pattern of a customer, and in this case, a selection (change) of the level may be limited by further considering a heat load of the vehicle.

In the meantime, the controller 150 may determine the starting acceleration entry that is the duty control logic at the start from the stop state, and an overtaking acceleration entry that is the duty control logic when a vehicle speed is increased and the driver steps on the accelerator pedal within the vehicle speed through the second map.

For example, when the vehicle speed detected in the A/C ON state is equal to or larger than V1 and is less than 60 kph (V1≤vehicle speed≤60 kph), and it is determined that the detected engine rpm and the amount of opening of the APS are increased 30% of the APS opening condition for each engine rpm (800 rpm to 6,000 rpm), and an angular speed of the APS is increased by 150%/sec or more, the controller 150 may determine that the driver enters the overtaking acceleration. The angular speed of the APS means an APS change rate (for example, [APS(1)−APS(0)]/10 ms≥150%/sec based on a sampling speed of 10 ms) based on the APS CAN communication speed based on a gradient of 150%/sec.

In the meantime, the controller 150 detects the driving pattern of the driver for the set unit time, and measures the number of times of the entry and an entry time of a driving pattern monitoring section (starting acceleration+starting/overtaking acceleration boundary section) set according to the starting acceleration and overtaking acceleration conditions set through the second map. Herein, the number of times of the entry is counted one time when the entry to the monitoring section is released after the entry to the monitoring section, and the entry time means a time elapsed from the entry to the monitoring section to the release of the entry of the monitoring section.

The controller 150 calculates an entry frequency and an entry time by summing up the number of times of the entry to the driving pattern monitoring section and the entry time for the unit time, and utilizes the calculated entry frequency and entry time for calculating each level change amount.

In the meantime, FIG. 5 represents a third map (MAP_3) for determining a level change amount according to the monitoring of the driving pattern according to the exemplary embodiment of the present disclosure.

Referring to FIG. 5, the controller 150 calculates each of a first level change amount (Level_change_freq) according to the entry frequency of the driving pattern monitoring section and a second level change amount (Level_change_time) according to the entry time for the unit time by utilizing the third map (MAP_3).

The controller 150 calculates the first level change amount (±) of the number of times, by which the entry frequency is larger (+) or smaller (−) than the reference number (for example, 3) of times set in the third map.

The controller 150 calculates the second level change amount (±) by the time, in which the entry time (Level_change_time) is longer (+) or shorter (−) than the reference entry time (for example, more than 4.0 and 6.0 or less) set in the third map. Each of the level change amounts is set not to exceed a maximum of ±3 phases per unit time, and is limited to be changed only from the minimum level 0 to the maximum level 9 set in the first map.

Further, the controller 150 determines the smaller value between the first level change amount and the second level change amount as a final level change amount.

For example, when the entry frequency of the driving pattern monitoring section is two times (+1) and the entry time is a total of 1.5 second (+2) for the unit time starting with initial level 5, the controller 150 determines the smaller value (+1) between the two values as a final level change amount.

Further, the controller 150 may determine level 6 changed upwardly by +1 from current level 5 as a changed level (Level_temp) determined according to the starting acceleration entry frequency and the entry time, and proceed to a next unit time and update the determined changed level in the second map at the same time.

In this case, the value measured when an average of the vehicle speeds for the entire unit time is equal to or smaller than the set reference vehicle speed (for example, 50 kph) is not significant, so that the controller 150 may exceptionally maintain the existing level without the level change.

In the meantime, the controller 150 may check a heat load of the vehicle in real time through the operation information detector 130, and set a level limit in consideration of the heat load of the vehicle.

FIG. 6 represents a fourth map (MAP_4), in which a level limit is set according to a heat load of the vehicle according to the exemplary embodiment of the present disclosure.

Referring to FIG. 6, the fourth map stores heat loads of the vehicle including an outdoor temperature, a thermistor (EVAP) temperature, a COMP duty, a blower voltage, an INCA temperature, a solar radiation (photo) temperature, an FATC setting (Tset) temperature, and an intake setting temperature, and a level limit for each setting condition of each heat load item. The fourth map sets the level limit in which various factors related to the heat loads are combined, and more objectively determines the heat load of the vehicle.

In the foregoing description, level 0 to a maximum of level 9 may be selected in the first map, but the level limit is a value limiting a level selection range in the first map by reflecting the heat load condition. For example, when an outdoor temperature of the vehicle is 35° C., level 9 or less (≤9) may be selected, but when an outdoor temperature is 38° C., a level selectable range is decreased to level 2 or less (≤2), and when an outdoor temperature exceeds 40° C., level 0 is fixed. That is, when the heat load of the vehicle is increased, the selection of the level is limited in a direction of securing cooling performance.

The controller 150 determines the smallest value among the level limits determined in the heat load items (factors) measured in real time as a final level limit.

For example, when the level limits of the measured heat loads are an outdoor temperature of 25° C. (Level_limit=9), a thermistor temperature of 6.0° C. (Level_limit=9), a COMP duty of 100% (Level_limit=0), a blower voltage of 9.0 V (Level_limit=9), an INCA temperature of 22.5° C. (Level_limit=9), Photo of 0.5 V (Level_limit=9), a Tset temperature of 20° C. (Level_limit=9), and INTAKE of 0.31 (Level_limit=5), the controller 150 determines the level limit 0 of the COMP duty, which is the smallest among the level limits, as a final level limit.

In the meantime, the controller 150 compares the changed level (Level_temp) determined according to the starting acceleration entry frequency and the entry time based on the driving pattern with the final level limit determined based on the heat load of the vehicle, and determines a smaller value as a final level (Level_current).

That is, the changed level (Level_temp) determined based on the driving pattern cannot exceed the final level limit determined based on the heat load, and may be changed and selected only within the limit. When the changed level (for example, level 9) exceeds the final level limit (for example, level 6), the final level limit is determined as a final level (for example, level 6).

The reason why the changed level determined based on the driving pattern is limited to the final level limit determined based on the heat load is the purpose of controlling the starting acceleration entry so as to secure cooling performance determined through various factors related to the heat loads and maximally improve fuel efficiency.

The controller 150 updates the determined final level in the second map every unit time and re-sets the starting acceleration entry condition. Further, the starting acceleration entry condition is initialized to level 5 when the starting of the vehicle is off or the air conditioner is off (A/C select OFF). However, when the A/C cut is generated due to various reasons, such as driver's unintended brake negative pressure and starting/overtaking duty control, in the state where an operation of the air conditioner is maintained (A/C select ON), the starting acceleration entry condition according to the application of the final level is maintained.

In the meantime, FIG. 7 represents a fifth map (MAP_5), in which a starting acceleration duty is determined according to the exemplary embodiment of the present disclosure.

Referring to FIG. 7, the fifth map is a starting acceleration duty determination table, in which an A/C duty limit for each engine rpm condition is set when the driver enters the starting acceleration by the satisfaction of the amount of opening of the APS of the driver according to the setting of the starting acceleration entry condition to which the final level is applied.

For example, when it is assumed that the final level 9 is applied to the fifth map, the entry condition control constants of level 9 are applied to each of the items of the fifth map, to control the compressor with the A/C duty limit for each engine rpm in accordance with the APS entry condition. The duty limit is a value for determining the amount of momentary decrease in the A/C duty control value basically set in the vehicle.

That is, as described above, the controller 150 updates the entry condition control constant values V1 and S1 to S8 of the final level (Level_current) in the second map at every unit time start point and sets the starting acceleration entry condition. In this case, when the determination of the final level and the setting of the starting acceleration entry condition is the determination of a probability in the entry to the A/C duty control, the fifth map serves to determine the amount of decrease in the A/C duty during the entry to the starting acceleration.

The controller 150 may be implemented by one or more processors operating by a set program, and the set program may include a series of commands for performing each operation of a compressor control method according to the exemplary embodiment of the present disclosure.

Hereinafter, a method of controlling a compressor according to an exemplary embodiment of the present disclosure will be described with reference to FIGS. 8 and 9. However, in describing the method of controlling the compressor, the detailed configurations may be combined in one compressor control apparatus 100, so that the method will be described based on operation of the compressor control apparatus 100.

Figure 8:
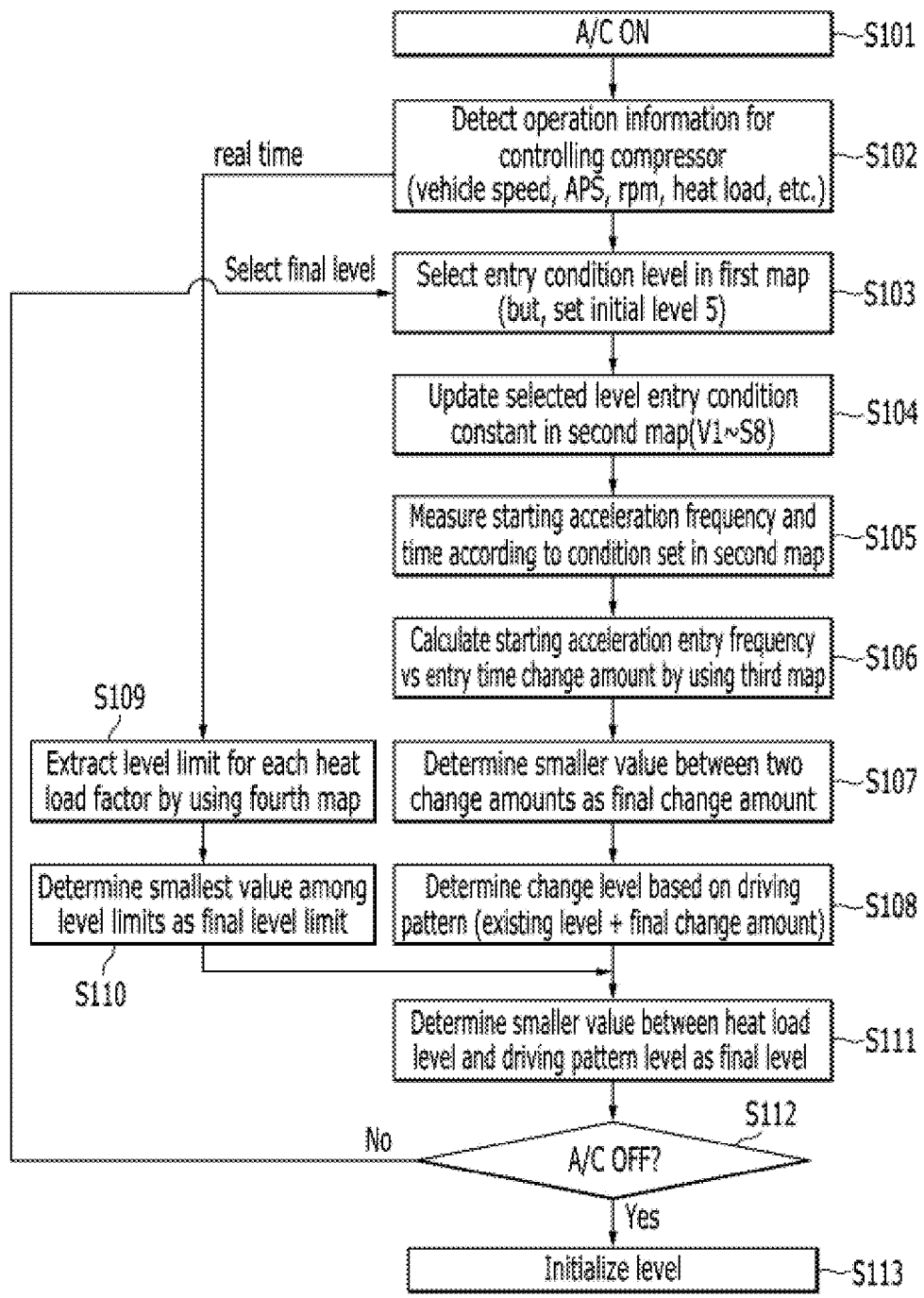
FIG. 8 is a flowchart illustrating a compressor control method, in which a compressor is actively and variably controlled according to a driving pattern and an inside heat load according to an exemplary embodiment of the present disclosure.

FIG. 8 is a flowchart illustrating a compressor control method, in which a compressor is actively and variably controlled according to a driving pattern and an inside heat load according to an exemplary embodiment of the present disclosure.

Referring to FIG. 8, when an air conditioner of the vehicle is operated (AC ON) (S101), the compressor control apparatus 100 detects driving information for controlling the compressor 121 according to an operation of the vehicle (S102). The compressor control apparatus 100 may detect a vehicle speed, the opening of the APS, whether the BPS is operated, an engine rpm, an acceleration, an outdoor temperature, an inside heat load, and an A/C operation time, and the like through the operation information detector 130.

The compressor control apparatus 100 selects level 5, which is set as a default at an initial time of the operation of the air conditioner, in the first map (MAP_1), in which an entry condition control constant is divided based on the plurality of levels for variably controlling a starting acceleration entry condition of the vehicle (S103).

The compressor control apparatus 100 updates the entry condition constants of selected level 5 in the second map and sets a starting acceleration entry condition based on level 5 (S104).

The compressor control apparatus 100 measures the number of times of the entry and an entry time of a monitoring section set according to the starting acceleration condition set in the second map (S105). In this case, the compressor control apparatus 100 may sum up the number of times of the entry and the entry time of the driving pattern monitoring section for a unit time and calculate an entry frequency and an entry time.

The compressor control apparatus 100 calculates a first level change amount according to the entry frequency summed for the unit time and a second level change amount according to the entry time summed for the unit time by using a third map (S106).

The compressor control apparatus 100 determines a smaller change value between the first level change amount according to the entry frequency and the second level change amount according to the entry time as a final change amount (S107).

The compressor control apparatus 100 adds the final change amount to an existing level applied to the starting acceleration entry condition and determines a driving pattern based change level (Level_temp) (S108).

For example, in describing the method based on operations S105 to S108, when the entry frequency of the driving pattern monitoring section is two times (+1) and the entry time is a total of 1.5 second (+2) for the unit time starting with initial level 5, the controller 150 calculates the smaller value (+1) between the two values as a final level change amount. Further, level 6 changed upwardly by +1 from existing level 5 may be determined as the change level (Level_temp) determined according to the entry frequency and the entry time of the starting acceleration.

In the meantime, the compressor control apparatus 100 collects a heat load of the vehicle through the operation information detector 130 in real time, and extracts a level limit condition according to the heat load of the vehicle by using the fourth map (S109). In this case, the compressor control apparatus 100 may extract a level limit for each heat load factor of the vehicle including an outdoor temperature, a thermistor (EVAP) temperature, a COMP duty, a blower voltage, an INCA temperature, a solar radiation (photo) temperature, an FATC setting (Tset) temperature, and an intake setting temperature through the fourth map.

The compressor control apparatus 100 determines the smallest value among the level limits of the heat load factors of the vehicle as a final level limit (S110).

The compressor control apparatus 100 compares the changed level (Level_temp) determined according to the driving pattern with the final level limit determined based on the heat load of the vehicle, and determines a smaller value as a final level (Level_current) (S111).

For example, when the changed level derived by the driving pattern is level 6 and the final level limit derived by the heat load of the vehicle is level 8, the compressor control apparatus 100 may determine level 6 as the final level. However, when the changed level is level 6 and the final level limit is level 5, the changed level may be changed only within a range of the final level limit, so that the compressor control apparatus 100 may determine level 5 as the final level.

When the operation of the air conditioner is not terminated (A/C OFF) (S112, NO), the compressor control apparatus 100 returns to operation S103 and selects the final level (Level_current) at a unit time end time (or a start time of a next unit time) in the first map and changes the starting acceleration entry condition according to the selected final level.

However, when the final level is the same as the existing level or an average of the vehicle speed for the unit time is equal to or lower than a set reference vehicle speed (for example, 5 kph), the compressor control apparatus 100 maintains the existing level without a level change update.

In the meantime, when the operation of the air conditioner is terminated (A/C OFF) (S112, YES) in operation S112, the compressor control apparatus 100 initializes the final level to level 5 and terminates an active and variable control logic of the compressor 121 (S113).

In the meantime, a compressor duty control method according to the starting acceleration condition set in the second map in operation S105 of FIG. 8 will be described in detail with reference to FIG. 9.

Figure 9:
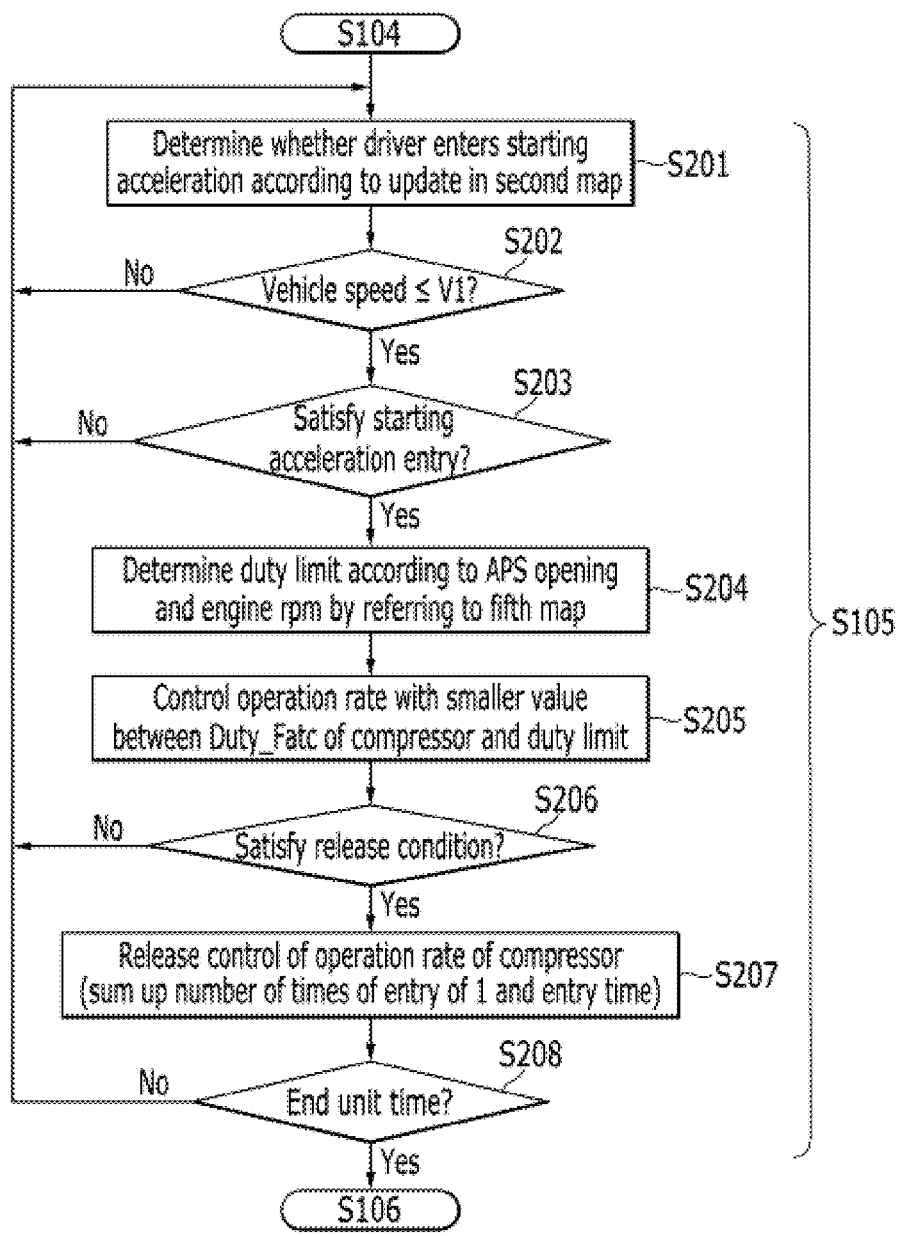
FIG. 9 is a flowchart illustrating a compressor duty control method according to setting of a starting acceleration entry condition according to an exemplary embodiment of the present disclosure.

FIG. 9 is a flowchart illustrating the compressor duty control method according to the setting of the starting acceleration entry condition according to the exemplary embodiment of the present disclosure.

Referring to FIG. 9, when the starting acceleration entry condition based on initial level 5 is set in the second map, the compressor control apparatus 100 detects a vehicle speed, an engine rpm, and the opening of the APS from the operation information detector 130 and determines whether a driver enters the starting acceleration (S201).

When the vehicle speed is not equal to or lower than a set vehicle speed V1 (S202, NO) or the engine rpm and the opening of the APS do not satisfy the starting acceleration entry condition (S203, NO), the compressor control apparatus 100 does not determine that the driver enters the starting acceleration and continuously detects operation information.

However, when the vehicle speed is equal to or lower than the set vehicle speed V1 (S202, YES) and the engine rpm and the opening of the APS satisfies the starting acceleration entry condition set in the second map (S203, YES), the compressor control apparatus 100 determines that the driver enters the starting acceleration.

Then, the compressor control apparatus 100 performs an operation of determining the decrease amount of operation of the compressor 121 according to the determination of the starting acceleration entry of the vehicle.

The compressor control apparatus 100 determines a duty limit (Duty_limit) for each engine rpm corresponding to the opening of the APS of the starting acceleration entry condition set in the fifth map (S204).

The compressor control apparatus 100 selects a smaller value between a basic duty (Duty_fatc) for controlling an operation rate of the variable capacity-type compressor 121 and a duty limit (Duty_limit) for each engine rpm determined through the fifth map and controls an operation rate of the compressor 121 (S205). The control of the operation rate of the compressor 121 is maintained until the starting acceleration entry is released.

In the meantime, at least one of the vehicle speed, the engine rpm, and the opening of the APS gets out of the starting acceleration entry condition and the starting acceleration entry release condition is satisfied (S206, YES), the compressor control apparatus 100 releases the control of the operation rate of the compressor 121 (S207). In this case, the compressor control apparatus 100 sums up the number of times of the starting acceleration entry of one and an entry time (second) according to the release of the control of the operation rate of the compressor 121.

When the set unit time does not end (S208, NO), the compressor control apparatus 100 returns to operation S201 and repeats the operation, and when the unit time ends (S208, YES), the compressor control apparatus 100 sums up the number of times of the entry and the entry time of the driving pattern monitoring section for the unit time and calculates an entry frequency and an entry time.

Then, the compressor control apparatus 100 performs the operation after operation S106 of FIG. 8, and when the final level applied to the next unit time is variably selected in the first map (S103) and is updated in the second map (S104), the compressor control apparatus 100 may repeat the operation of FIG. 9 and perform the control of the compressor according to the variably set starting acceleration entry condition according to the final level.

Figure 10:
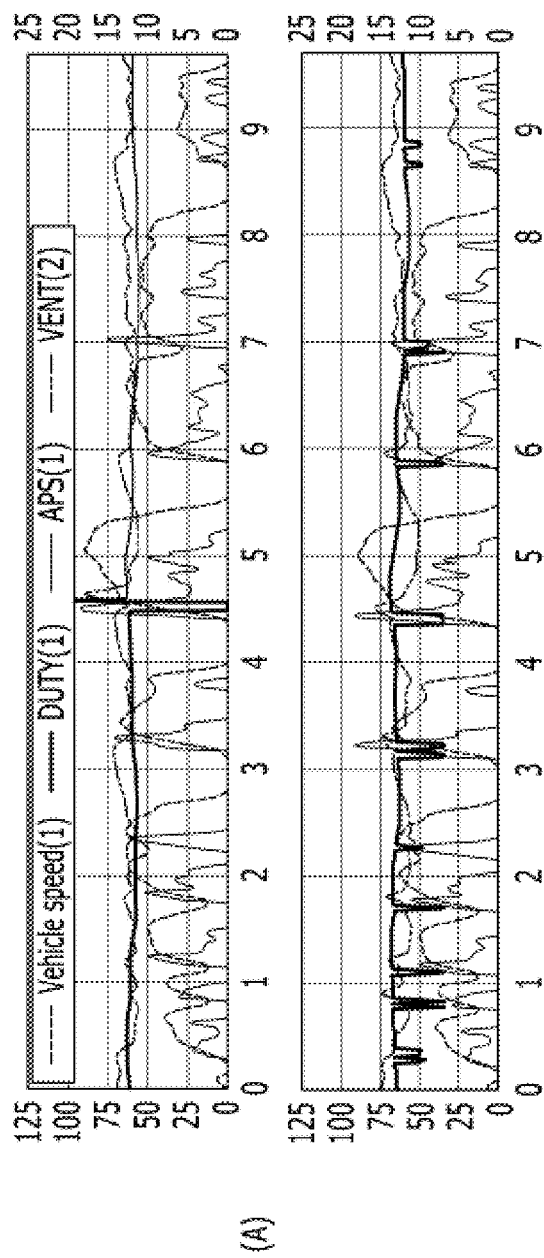
FIG. 10 is a diagram representing a result of a fuel efficiency evaluation of the compressor duty control method according to the exemplary embodiment of the present disclosure.

In the meantime, FIG. 10 is a diagram representing a result of a fuel efficiency evaluation of the compressor duty control method according to the exemplary embodiment of the present disclosure.

Referring to FIG. 10, as a result of the comparison and the test of the basic duty control logic and the compressor duty control logic according to the exemplary embodiment of the present disclosure, it is proved that the compressor duty control logic according to the exemplary embodiment of the present disclosure has a fuel efficiency improvement effect of about 1.0% based on the North America certified fuel efficiency (SC03 fuel efficiency), about 2.0% of the Indian CITY mode, and 2.5 to 5.0% on an actual road when the air conditioner is on (A/C ON).

According to the exemplary embodiment of the present disclosure, it is possible to implement the compressor control logic, by which a compressor is actively variably controlled according to a driving pattern of a driver and a heat load of a vehicle, thereby achieving an effect in reasonably address tradeoffs among cooling performance, fuel efficiency performance, and engine power performance without an increase in cost and weight according to an addition of hardware.

Further, it is possible to concentrate to make an indoor side be pleasant by maximizing cooling performance under a condition in which a heat load of the vehicle is high, and control an engine torque applied to the compressor by an optimum frequency according to a driving pattern of a driver when the heat load inside the vehicle is decreased, thereby achieving effects in securing cooling performance and maximizing fuel efficiency improvement.

In the foregoing, the exemplary embodiment of the present disclosure has been described, but the present disclosure is not limited only to the exemplary embodiment and may be variously changed.

For example, in the foregoing exemplary embodiment of the present disclosure, it is described that the air conditioner is operated (A/C ON), initial level 5 is applied, but the present disclosure is not limited thereto, when a level limit of a heat load of a vehicle measured in real time is "0" at the operation time of the A/C ON, level 0 may be applied as an initial value to set a starting acceleration condition. That is, even at the A/C ON operation time, it is possible to apply a level limit according to a heat load of a vehicle without exception.

Further, in the foregoing, the amount of operation of the accelerator pedal is described as the amount of opening of the APS, but has a meaning including any type of accelerator pedal sensor value measuring the degree of stepping the accelerator pedal by a driver, the amount of stepping the accelerator pedal, an accelerator pedal position value, a depth of stepping the accelerator pedal, and the like.

The exemplary embodiment of the present disclosure is not implemented only by the apparatus and/or the method described above, and may also be implemented through a program for performing a function corresponding to the configuration of the exemplary embodiment of the present disclosure, a recording medium, in which the program is recorded, and the like, and the implement may be easily carried out by those skilled in the art on the basis of the description of the foregoing exemplary embodiment.

What is claimed is:

1. An apparatus for controlling a compressor of an air conditioning device of a vehicle, the apparatus comprising:
    an operation information detector which detects operation information from various sensos according to an operation of the vehicle;
    the compressor which compresses a refrigerant for operating an air conditioner of the air conditioning device; and
    a controller which performs starting acceleration control of momentarily decreasing an operation rate of the compressor, which uses engine power in an acceleration situation of the vehicle,
    wherein the controller stores a first map, in which a starting acceleration entry condition according to a driving pattern and a heat load of the vehicle is defined in a plurality of levels, sets a starting acceleration entry condition having a final level corresponding to the driving pattern according to a starting acceleration entry frequency of a driver for a predetermined unit time within a limited level range of the first map, which is determined based on the heat load of the vehicle, and adjusts a starting acceleration control frequency of the compressor,
    wherein the controller sums up the starting acceleration entry frequency and an entry time based on the opening of the APS and the engine rpm on a period of the unit time when the air conditioner is operated and recognizes the driving pattern,
    wherein the controller calculates each of a first level change amount according to the starting acceleration entry frequency and a second level change amount according to the starting acceleration entry time for the unit time based on a starting acceleration entry condition of a set level by utilizing a third map which determines a change amount between the levels in the first map, and
    wherein the controller determines a smaller change value between the first level change amount according to the entry frequency and the second level change amount according to the entry time as a final change amount and determines a change level based on a driving pattern.

2. The apparatus of claim 1, wherein the first map includes starting acceleration entry condition control constants, which are set in a plurality of levels and are divided for a vehicle speed condition and an opening condition of an accelerator pedal sensor (APS) for each engine revolutions per minute (rpm) section.

3. The apparatus of claim 1, wherein:
    when the starting acceleration entry frequency of the driver is determined as a slow acceleration driving pattern in which a starting acceleration entry frequency is lower than a starting acceleration entry frequency of a general driving pattern, the controller changes a level in a direction, in which the starting acceleration entry frequency is increased, in the first map, and
    when the starting acceleration entry frequency of the driver is determined as a rapid acceleration driving pattern in which a starting acceleration entry frequency is higher than the starting acceleration entry frequency of the general driving pattern, the controller changes a level in a direction, in which the starting acceleration entry frequency is decreased, in the first map.

4. The apparatus of claim 1, wherein the controller updates the final level selected in the first map according to the driving pattern and the heat load of the vehicle in a second map which sets the starting acceleration entry condition, and recognizes whether the driver enters starting acceleration according to the vehicle speed, the engine rpm, and the opening of the APS detected by the operation information detector.

5. The apparatus of claim 1, wherein the controller compares a starting acceleration entry condition change level determined based on the driving pattern and a level limit determined based on the heat load of the vehicle, and sets a smaller level between two levels as a starting acceleration entry condition.

6. The apparatus of claim 1, wherein the controller determines the real-time detected heat load of the vehicle through a fourth map, in which a level limit is set for each heat load of the vehicle, and determines the smallest value among the level limits as a final level limit.

7. The apparatus of claim 6, wherein the fourth map stores a level limit for each of setting conditions of heat load items including an outdoor temperature, a thermistor temperature, a compressor duty, a blower voltage, an in-car sensor (INCA) temperature, a solar radiation temperature, an automatic air conditioner (FATC) setting temperature, and an intake setting temperature.

8. The apparatus of claim 1, wherein the controller controls an operation rate of the compressor by an operation rate limit corresponding to the opening of the APS and the engine rpm of the vehicle by utilizing a fifth map, in which a compressor operation rate limit (duty limit) is set base on an opening condition of the APS and an engine rpm condition based on the final level.

9. The apparatus of claim 1, wherein when an average of the vehicle speeds for the unit time is equal to or lower than a set reference vehicle speed, the controller maintains a starting acceleration maintenance condition having an existing set level without a change in a level.

10. A method of controlling a compressor of a compressor control apparatus, which performs starting acceleration control of momentarily decreasing an operation rate of the compressor of an air conditioning device using engine power during acceleration of a vehicle, the method comprising the steps of:
- a) when an air conditioner of the vehicle is operated, detecting operation information from various sensors for controlling the compressor according to an operation of the vehicle;
- b) selecting, by a controller, an initial level designated in a first map, in which a starting acceleration entry condition is defined in a plurality of levels according to a driving pattern and a heat load of the vehicle and setting a starting acceleration entry condition;
- c) summing up, by the controller, a starting acceleration entry frequency and an entry time for a predetermined unit time according to the driving pattern of a driver and determining a change level in the first map;
- d) determining, by the controller, a final level limit selectable in the first map based on the real-time detected heat load of the vehicle; and
- e) comparing, by the controller, the change level and the final level limit and determining a smaller value as a final level, and changing the starting acceleration entry condition on a period of a next unit time, wherein the step c) includes:
calculating a first level change amount according to the starting acceleration entry frequency for the unit time based on the starting acceleration entry condition of the set level by utilizing a third map, which determines a change amount between the levels in the first map; and
calculating a second level change amount according to a starting acceleration entry time for the unit time, and wherein, operation c) includes
determining a smaller value between the first level change amount and the second level change amount as a final change amount and selecting a change level based on the driving pattern.

11. The method of claim 10, wherein the step b) includes:
updating the starting acceleration entry condition control constant of the initial level in a second map, and setting a starting acceleration entry condition according to a vehicle speed, an engine rpm, and the opening of an accelerator pedal sensor (APS) based on the initial level.

12. The method of claim 10, wherein the step c) includes:
extracting a level limit for each real-time detected heat load factor of the vehicle through a fourth map, in which a level limit for heat load of the vehicle is set; and
determining the smallest value among the level limits of the extracted heat load factors of the vehicle as the final level limit.

13. The method of claim 10, wherein the heat load of the vehicle includes at least one of an outdoor temperature, a thermistor temperature, a compressor duty, a blower voltage, an in-car sensor (INCA) temperature, a solar radiation temperature, an automatic air conditioner (FATC) setting temperature, and an intake setting temperature.

14. The method of claim 10, wherein the step c) includes:
- c-1) detecting a vehicle speed of the vehicle, an engine rpm, and the opening of the APS and determining that the driver enters starting acceleration when the starting acceleration entry condition is satisfied;
- c-2) controlling an operation rate of the compressor by a duty limit corresponding to the opening of the APS and the engine rpm of the vehicle to which the initial level is applied by utilizing a fifth map, in which a compressor duty limit is set based on the opening of the APS and an engine rpm condition; and
- c-3) summing up the number of times of starting acceleration entry and an entry time when the starting acceleration entry is released.

15. The method of claim 14, wherein the step c-2) includes:
selecting a smaller value between the duty limit and a basic duty (Duty_fatc) for controlling an operation rate of a variable capacity-type compressor and controlling an operation rate of the compressor.

* * * * *